US009545784B2

(12) United States Patent
Nakamura

(10) Patent No.: US 9,545,784 B2
(45) Date of Patent: Jan. 17, 2017

(54) PROJECTION IMAGE CORRECTION SYSTEM AND PROJECTION IMAGE CORRECTION METHOD

(71) Applicant: Roland DG Corporation, Hamamatsu-shi, Shizuoka (JP)

(72) Inventor: Yasutoshi Nakamura, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 339 days.

(21) Appl. No.: 14/312,788

(22) Filed: Jun. 24, 2014

(65) Prior Publication Data

US 2014/0379114 A1    Dec. 25, 2014

(30) Foreign Application Priority Data

Jun. 25, 2013 (JP) ................................. 2013-132484

(51) Int. Cl.
| | |
|---|---|
| *G06K 9/40* | (2006.01) |
| *B33Y 50/00* | (2015.01) |
| *G06T 3/00* | (2006.01) |
| *G03B 21/00* | (2006.01) |

(52) U.S. Cl.
CPC .................. *B33Y 50/00* (2014.12); *G06T 3/00* (2013.01); *G03B 21/00* (2013.01)

(58) Field of Classification Search
USPC . 382/275, 276, 305, 149, 297, 317; 358/1.1, 358/1.14, 1.18, 1.9, 488; 378/29, 167; 399/159, 331, 372, 381; 700/120; 709/200
See application file for complete search history.

(56) References Cited

U.S. PATENT DOCUMENTS

| | | | | |
|---|---|---|---|---|
| 5,539,509 | A * | 7/1996 | Tomoe | G03G 15/2053 399/159 |
| 6,075,614 | A * | 6/2000 | Ohtsuka | H04N 1/4078 347/19 |
| 7,197,529 | B2 * | 3/2007 | Nakagawa | A61B 6/4216 378/167 |
| 7,202,960 | B2 * | 4/2007 | Nagashige | H04N 1/00002 358/1.14 |
| 8,988,726 | B2 * | 3/2015 | Atsumi | G03G 15/6567 358/1.18 |

FOREIGN PATENT DOCUMENTS

JP        4002983 B2    11/2007

* cited by examiner

*Primary Examiner* — Anh Do
(74) *Attorney, Agent, or Firm* — Keating and Bennett, LLP

(57) ABSTRACT

A projection image correction system includes a section that detects intersection coordinates in a corrected sheet image, a section that calculates a first projective transformation matrix for transformation of the detected intersection coordinates into intersection coordinates stored in advance, a section that generates two spatial code images from the corrected positive and negative images of Gray code patterns, a section that acquires intersections of brightness profiles in the positive and negative images, a section that acquires coordinates of an intersection of boundary lines in the two spatial code images, a section that calculates a second projective transformation matrix by which transformation is performed so that the acquired intersection coordinates, transformed by the first projective transformation matrix, are distributed over the entire region, and a section that transforms, using the second projective transformation matrix, image data to be outputted to a projector.

4 Claims, 13 Drawing Sheets q : CENTER COORDINATES WITH DESIRED SUB-PIXEL PRECISION p : COORDINATES OF EACH POINT WITHIN CIRCULAR FIELD OF VIEW R $Dp_i$ : BRIGHTNESS GRADIENT VECTOR FOR $p_i$

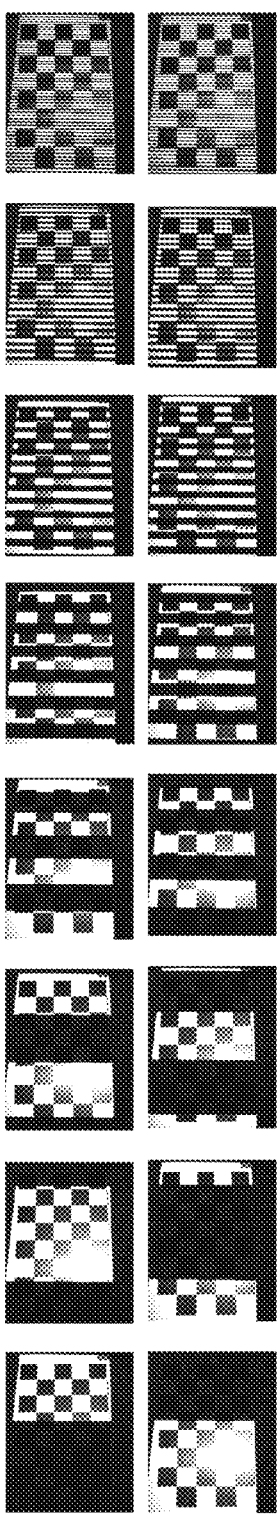
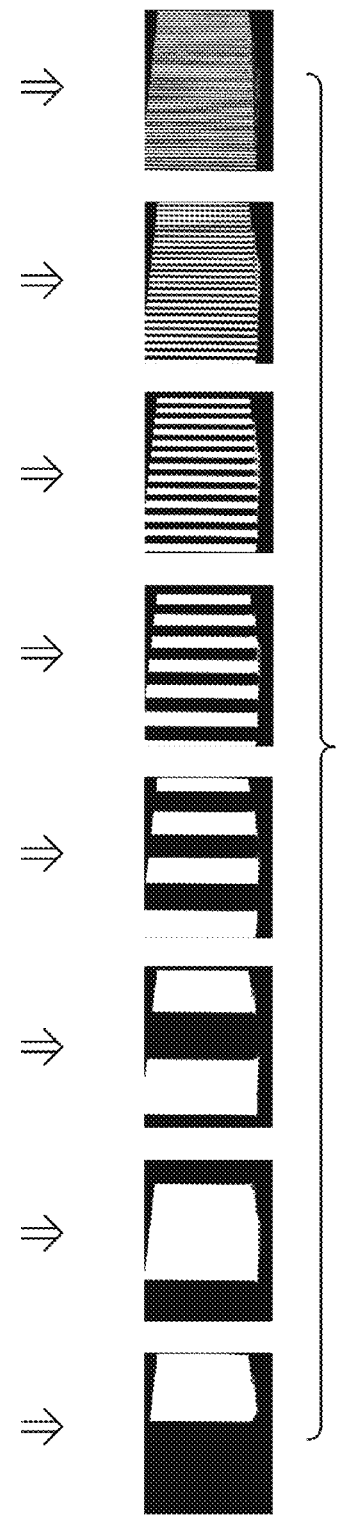
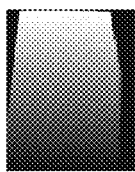
FIG.7A VERTICAL GRAY CODE PATTERN
POSITIVE IMAGES
NEGATIVE IMAGES
FIG.7B BINARY IMAGES
FIG.7C SPATIAL CODE IMAGE WHOSE CODE VALUE CHANGES IN LATERAL DIRECTION

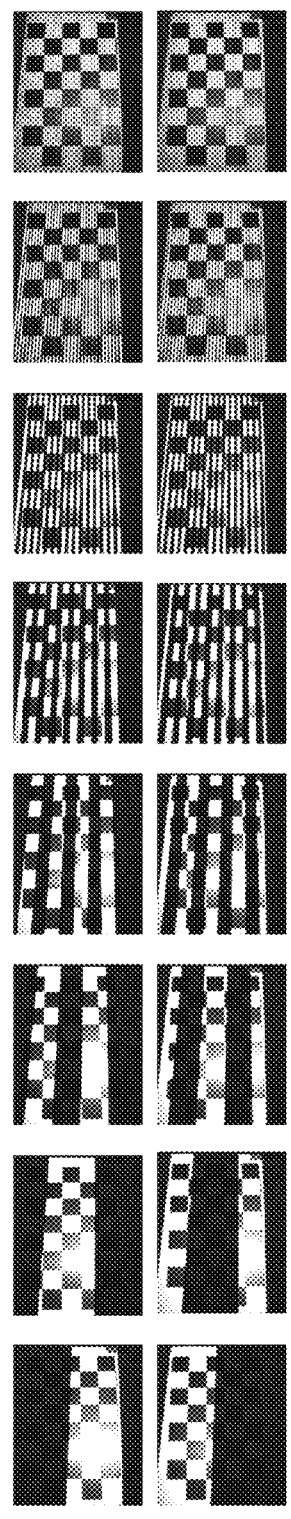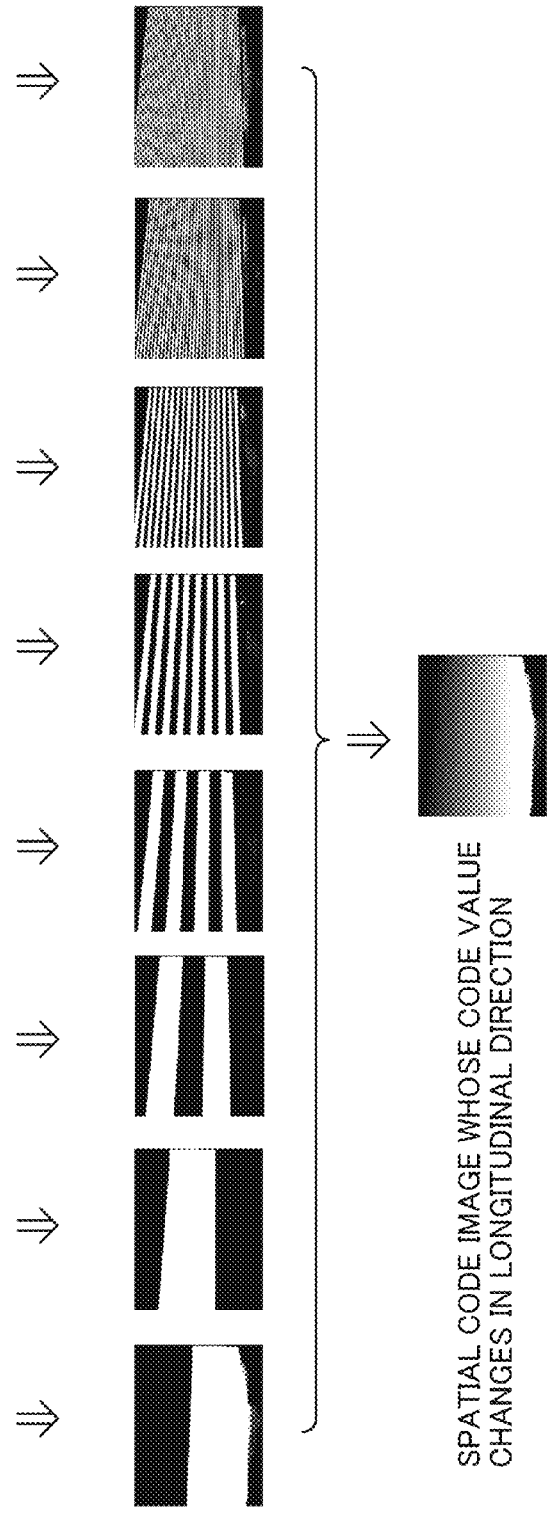
FIG.8A HORIZONTAL GRAY CODE PATTERN POSITIVE IMAGES / NEGATIVE IMAGES
FIG.8B BINARY IMAGES
FIG.8C SPATIAL CODE IMAGE WHOSE CODE VALUE CHANGES IN LONGITUDINAL DIRECTION FIG.11
SPATIAL CODE IMAGE WHOSE
CODE VALUE CHANGES IN
LATERAL DIRECTION
LATERALLY ARRANGED
BOUNDARY LINES
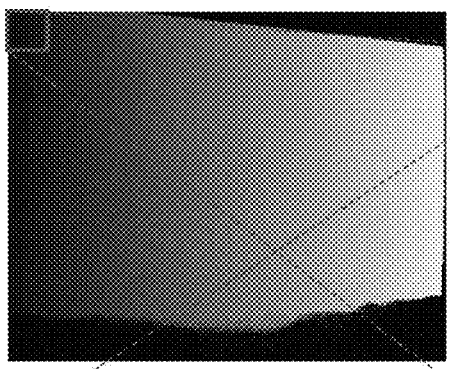
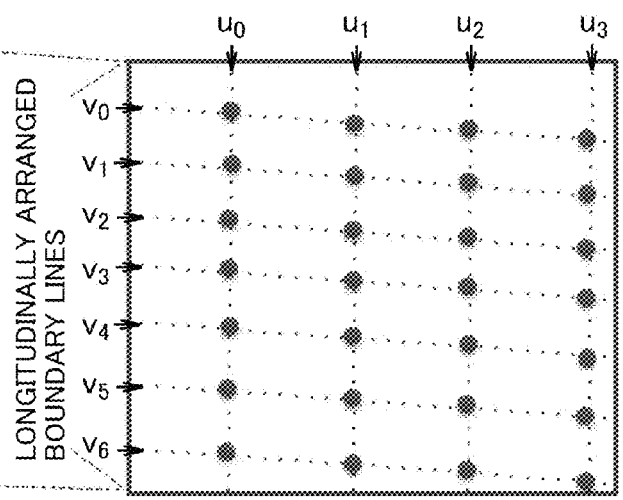
SPATIAL CODE IMAGE WHOSE
CODE VALUE CHANGES IN
LONGITUDINAL DIRECTION (1366+5)/6=228
LATERAL CODE VALUES RANGE FROM 0 TO 227
LATERALLY ARRANGED BOUNDARY LINES $U_n$ RANGE FROM $U_0$ TO $U_{226}$ (768+2)/3=256
LONGITUDINAL CODE VALUES RANGE FROM 0 TO 255
LONGITUDINALLY ARRANGED BOUNDARY LINES $V_n$ RANGE FROM $V_0$ TO $V_{254}$

PROJECTION IMAGE CORRECTION SYSTEM AND PROJECTION IMAGE CORRECTION METHOD

This application claims priority on Patent Application No. 2013-132484 filed in Japan on Jun. 25, 2013, the entire contents of which are hereby incorporated by reference.

BACKGROUND OF THE INVENTION

1. Field of the Invention

The present invention relates to projection image correction systems and projection image correction methods. More specifically, the present invention relates to a projection image correction system and a projection image correction method for correcting an image projected on an image projection region from a projector.

2. Description of the Related Art

A stereolithography apparatus that produces a three-dimensional shaped object by using a photo-curable resin in liquid form is conventionally known. A photo-curable resin has the property of being cured with irradiation of light such as visible light or ultraviolet light.

As such a stereolithography apparatus, a "lifting type" stereolithography apparatus, for example, is used. In the lifting type stereolithography apparatus, three-dimensional shaping is performed by sequentially stacking photo-curable resins each cured into a given shape.

In the lifting type stereolithography apparatus, a transparent plate is used as a bottom wall of a container that stores a photo-curable resin in liquid form. A shaped object holing plate serving as a base for a three-dimensional shaped object is disposed inside the container. With irradiation of light from below the transparent plate, the photo-curable resin is cured by a given liquid layer thickness at a lower surface of the shaped object holding plate. Thus, a cured layer having a given liquid layer thickness is provided at the lower surface of the shaped object holding plate.

Then, the cured layer cured between the shaped object holding plate and the transparent plate is peeled off from the transparent plate serving as the bottom wall of the container, and the shaped object holding plate is raised by a given liquid layer thickness.

Subsequently, with irradiation of light from below the transparent plate, the photo-curable resin is cured by a given liquid layer thickness to provide another cured layer in addition to the cured layer provided at the lower surface of the shaped object holding plate.

These operations are repeated in sequence, thus providing a three-dimensional shaped object.

With the use of the lifting type stereolithography apparatus, cured layers each having a desired shape are sequentially stacked by repeating the above-described operations in sequence. As a result, a three-dimensional shaped object having a desired shape can be produced.

SUMMARY OF THE INVENTION

In such a stereolithography apparatus, a given image has to be projected on an interface between a bottom wall of a container and a photo-curable resin layer from a projector in order to allow a photo-curable resin stored in the container to be cured into a desired shape.

Therefore, in the stereolithography apparatus, installation position and/or orientation of the projector must be adjusted so that an image is projected in a proper state on the interface between the bottom wall of the container and the photo-curable resin layer.

As used herein, the term "proper state" refers to a state in which an image is projected on an image projection region from the projector without any distortion in shape. Note that the image projection region is a shaping region at the bottom wall of the container (i.e., a region where an image is actually projected and a three-dimensional shaped object is provided by a photo-curable resin).

As a technique for adjusting projector position and/or orientation, a technique disclosed in Japanese Patent No. 4002983, for example, is known.

Japanese Patent No. 4002983 discloses a technique for providing a mechanism for adjusting projector position and/or orientation. In the technique disclosed in Japanese Patent No. 4002983, an image projected from a projector is projected in a proper state on an image projection region of an image projection surface (i.e., an interface between a bottom wall of a container and a photo-curable resin layer). Hereinafter, an image projection region of an image projection surface will simply be referred to as an "image projection region" as appropriate.

However, when the mechanism for adjusting projector position and/or orientation is provided in a stereolithography apparatus, the resulting stereolithography apparatus itself is undesirably increased in size. Furthermore, fabrication cost for the stereolithography apparatus is disadvantageously increased in order to provide this mechanism.

If an image projected from a projector is corrected so that the image is in a proper state in an image projection region without providing a mechanism for adjusting projector position and/or orientation, the image is projected in a proper state on the image projection region without causing the above-mentioned problems.

Accordingly, preferred embodiments of the present invention provide a projection image correction system and a projection image correction method which allow an image projected from a projector to be corrected so that the image is in a proper state in an image projection region.

A projection image correction system according to a preferred embodiment of the present invention is a projection image correction system for correcting image data to be outputted to a projector, the system including an image-taking section configured to take, via a lens, an image of a checkered sheet placed in a region where an image is projected from the projector; a correction section configured to correct lens-induced distortion of the taken checkered sheet image by using an internal parameter of the image-taking section; a checker intersection coordinate detection section configured to detect, with sub-pixel precision, checker intersection coordinates in the corrected checkered sheet image; a first transformation matrix calculation section configured to calculate a first projective transformation matrix for projective transformation of the detected checker intersection coordinates into checker intersection coordinates located at equal intervals in the region; a generation section configured to correct, when first positive images and first negative images of an 8-bit vertical Gray code pattern projected on the region from the projector are taken by the image-taking section, lens-induced distortion of the taken first positive images and first negative images by using the internal parameter of the image-taking section, and generate a first spatial code image whose code value changes in a lateral direction based on the corrected first positive images and first negative images, and to correct, when second positive images and second negative images of an 8-bit horizontal Gray code pattern projected on the region from the projector are taken by the image-taking section, lens-induced distortion of the taken second positive images and second negative images by using the internal parameter of the image-taking section, and generate a second spatial code image whose code value changes in a longitudinal direction based on the corrected second positive images and second negative images; a boundary coordinate acquisition section configured to obtain, with sub-pixel precision, an intersection of brightness profiles in the corrected first positive images and first negative images, and obtain, with sub-pixel precision, an intersection of brightness profiles in the corrected second positive images and second negative images, thus acquiring the obtained intersections as boundary coordinates; a boundary line intersection acquisition section configured to acquire, based on the acquired boundary coordinates, a boundary line connecting the boundary coordinates of the same code value in each of the first and second spatial code images, and combine the first and second spatial code images, thus acquiring coordinates of an intersection of the boundary line in the first spatial code image and the boundary line in the second spatial code image; a second transformation matrix calculation section configured to transform the acquired intersection coordinates by using the first projective transformation matrix, and calculate a second projective transformation matrix by which projective transformation is performed so that the transformed intersection coordinates are distributed over the entire region; and an image data correction section configured to transform, using the second projective transformation matrix, image data to be outputted to the projector, thus correcting the image data.

A projection image correction method according to another preferred embodiment of the present invention is a projection image correction method for correcting image data to be outputted to a projector, the method including preparing an image-taking section that includes a lens; taking, via the lens, an image of a checkered sheet placed in a region where an image is projected from the projector; correcting lens-induced distortion of the taken checkered sheet image by using an internal parameter of the image-taking section; detecting, with sub-pixel precision, checker intersection coordinates in the corrected checkered sheet image; calculating a first projective transformation matrix for projective transformation of the detected checker intersection coordinates into checker intersection coordinates located at equal intervals in the region; taking first positive images and first negative images of an 8-bit vertical Gray code pattern projected on the region from the projector by the image-taking section, correcting lens-induced distortion of the taken first positive images and first negative images by using the internal parameter of the image-taking section, and generating a first spatial code image whose code value changes in a lateral direction based on the corrected first positive images and first negative images; taking second positive images and second negative images of an 8-bit horizontal Gray code pattern projected on the region from the projector by the image-taking section, correcting lens-induced distortion of the taken second positive images and second negative images by using the internal parameter of the image-taking section, and generating a second spatial code image whose code value changes in a longitudinal direction based on the corrected second positive images and second negative images; obtaining, with sub-pixel precision, an intersection of brightness profiles in the corrected first positive images and first negative images, and obtaining, with sub-pixel precision, an intersection of brightness profiles in the corrected second positive images and second negative images, thus acquiring the obtained intersections as boundary coordinates; acquiring, based on the acquired boundary coordinates, a boundary line connecting the boundary coordinates of the same code value in each of the first and second spatial code images, and combining the first and second spatial code images, thus acquiring coordinates of an intersection of the boundary line in the first spatial code image and the boundary line in the second spatial code image; transforming the acquired intersection coordinates by using the first projective transformation matrix, and calculating a second projective transformation matrix by which projective transformation is performed so that the transformed intersection coordinates are distributed over the entire region; and transforming, using the second projective transformation matrix, image data to be outputted to the projector, thus correcting the image data.

A non-transitory computer readable storage medium according to a preferred embodiment of the present invention stores a program that allows a computer to function as the above-described projection image correction system.

A non-transitory computer readable storage medium according to another preferred embodiment of the present invention stores a program that allows a computer to carry out the above-described projection image correction method.

Various preferred embodiments of the present invention provide a projection image correction system and a projection image correction method which allow an image projected from a projector to be corrected so that the image is in a proper state in an image projection region.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is an explanatory representation illustrating positive images and negative images of an 8-bit vertical Gray code pattern.

FIG. 7B is an explanatory representation illustrating binary images obtained from the positive images and negative images of FIG. 7A.

FIG. 7C is a spatial code image which is generated from the eight binary images illustrated in FIG. 7B and whose code value changes in a lateral direction.

FIG. 8A is an explanatory representation illustrating positive images and negative images of an 8-bit horizontal Gray code pattern.

FIG. 8B is an explanatory representation illustrating binary images obtained from the positive images and negative images of FIG. 8A.

FIG. 8C is a spatial code image which is generated from the eight binary images illustrated in FIG. 8B and whose code value changes in a longitudinal direction.

FIG. 11 is an explanatory representation illustrating intersections of boundary lines in the spatial code image whose code value changes in the lateral direction, and boundary lines in the spatial code image whose code value changes in the longitudinal direction.

DETAILED DESCRIPTION OF THE PREFERRED EMBODIMENTS

Hereinafter, preferred embodiments of a projection image correction system, a projection image correction method, a program, and a non-transitory computer readable storage medium according to the present invention will be described with reference to the accompanying drawings.

Figure 1:
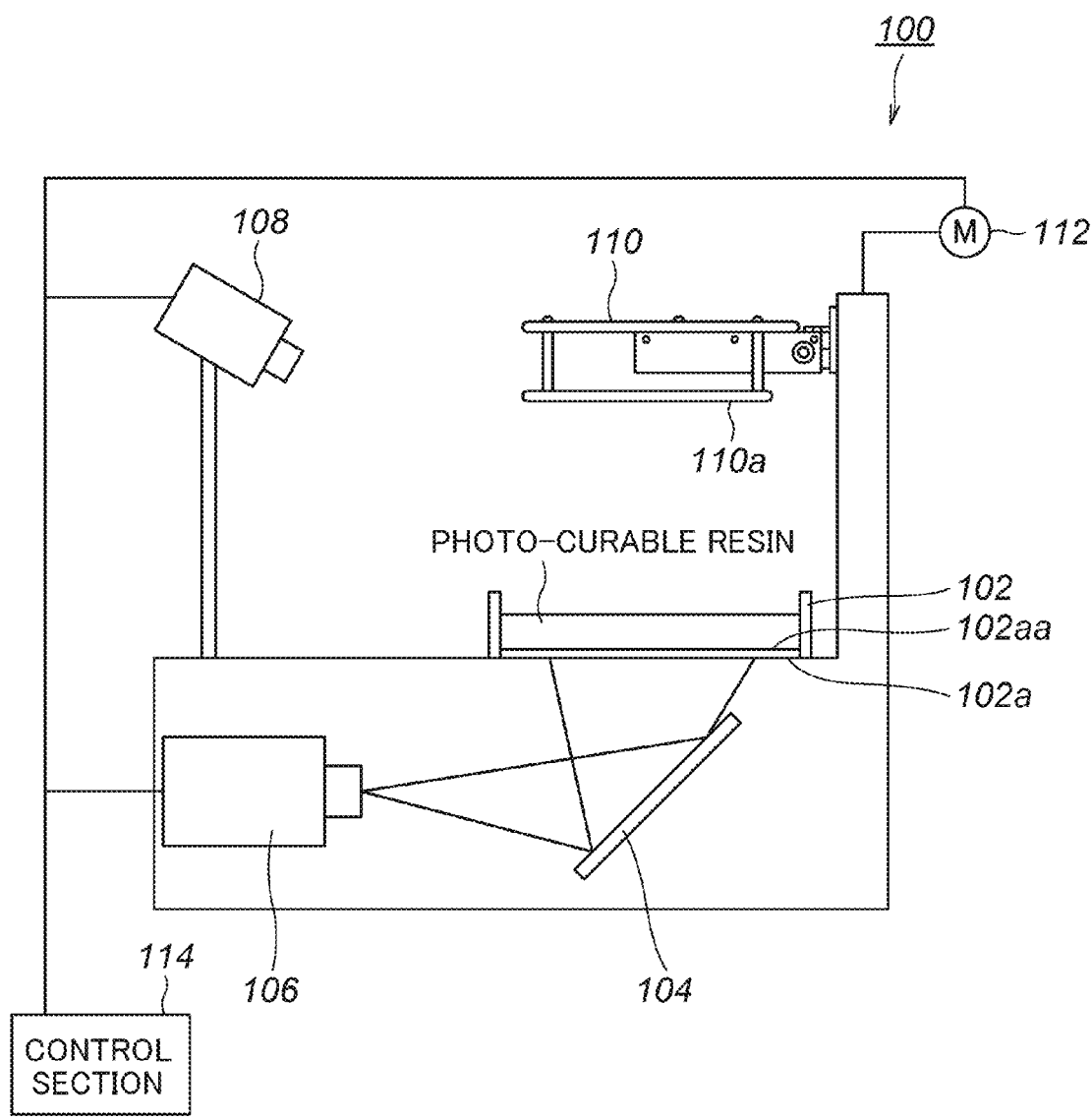
FIG. 1 is an explanatory diagram schematically illustrating a stereolithography apparatus including a projection image correction system according to a preferred embodiment of the present invention.
Figure 2:
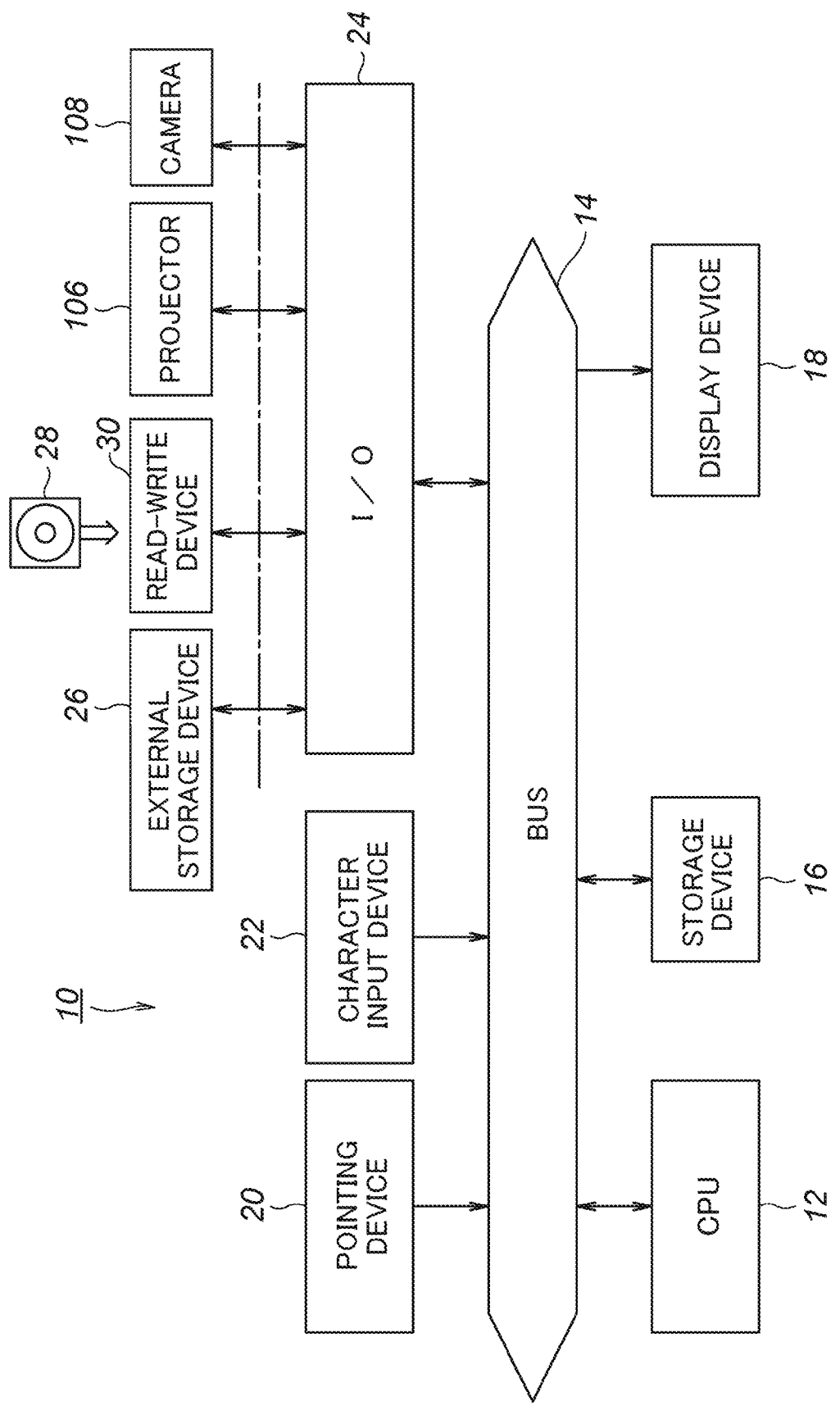
FIG. 2 is a block diagram illustrating a hardware configuration of the projection image correction system according to a preferred embodiment of the present invention.

FIG. 1 is an explanatory diagram schematically illustrating a stereolithography apparatus 100 including a projection image correction system 10 according to a preferred embodiment of the present invention. FIG. 2 is an explanatory block diagram illustrating a hardware configuration of the projection image correction system 10 according to the present preferred embodiment.

As illustrated in FIG. 1, the stereolithography apparatus 100 preferably includes a container 102, a mirror 104, a projector 106, a camera 108, a shaped object holding section 110, a driving section 112, and a control section 114.

The container 102 stores a photo-curable resin in liquid form which is cured with irradiation of light such as visible light or ultraviolet light. A bottom wall 102a of the container 102 is provided by a transparent plate. The container 102 is arranged so that an image projected from the projector 106 is projectable on an image projection surface which is an interface between the photo-curable resin and the bottom wall 102a.

Via the mirror 104, the projector 106 projects, on the bottom wall 102a of the container 102, an image outputted from the control section 114. More specifically, via the mirror 104, the projector 106 projects, on an image projection region of the image projection surface, the image outputted from the control section 114. The image outputted from the control section 114 is projected toward the bottom wall 102a of the container 102 from below the container 102.

The image projected from the projector 106 includes a plurality of pieces of image data in which a shape of a three-dimensional shaped object to be produced is horizontally divided and separated into a plurality of layers.

The projector 106 is controlled by the control section 114 so that the plurality of pieces of image data are projected in sequence for each layer at regular time intervals.

The camera 108 is disposed at a position at which the camera 108 can capture the image projected on the bottom wall 102a of the container 102 from the projector 106. The camera 108 preferably includes a lens. The camera 108 takes an image of the container 102 from above the container 102. The camera 108 is disposed at a position and orientation at which the camera 108 can take an image of the entire image projection region that is a region of the container 102 where the image is projected. As used herein, the term "image projection region" refers to a region where a three-dimensional shaped object is actually shaped by the stereolithography apparatus 100.

The shaped object holding section 110 holds the photo-curable resin cured inside the container 102. The shaped object holding section 110 serves as a base that holds a three-dimensional shaped object. A lower surface 110a of the shaped object holding section 110 is brought into intimate contact with the photo-curable resin cured inside the container 102. The lower surface 110a, which is a portion of the shaped object holding section 110 to be brought into intimate contact with the photo-curable resin, is preferably made of a metal material such as aluminum or stainless steel, for example. The lower surface 110a is processed into a rough surface with minute irregularities by sandblasting, for example.

The driving section 112 raises and lowers the shaped object holding section 110 in a vertical direction.

The control section 114 is configured and programmed to control the camera 108, the projector 106 and the driving section 112. The control section 114 sequentially outputs, to the projector 106, image data for each layer obtained when the three-dimensional shaped object is divided into a plurality of layers at regular time intervals. Thus, a given image is projected from the projector 106. The control section 114 drives the driving section 112 at regular time intervals. Thus, the shaped object holding section 110 is raised by a given amount at regular time intervals.

The control section 114 corrects the image data to be outputted to the projector 106 so that the image projected from the projector 106 is projected on the image projection region. The control section 114 performs a calculation process for a projective transformation matrix necessary when the image data to be outputted to the projector 106 is corrected. The control section 114 performs the image data correction and the calculation process irrespective of installation position and/or orientation of the projector 106.

The projection image correction system 10 according to the present preferred embodiment preferably includes at least the camera 108 and the control section 114.

The control section 114 preferably includes a computer and operations thereof are controlled by a central processing unit (hereinafter referred to as a "CPU") 12. The control section 114 is not limited to any particular type of computer. For example, the control section 114 may be a known personal computer or general-purpose computer.

The CPU 12 is connected via a bus 14 with: a storage device 16; a display device 18; a pointing device 20; a character input device 22; and an input-output interface circuit (I/O) 24 for various externally-connected devices. The storage device 16 preferably includes a read-only memory (ROM) and/or a random access memory (RAM). The ROM stores, for example, a program and/or various data for control performed by the CPU 12. The RAM preferably includes, for example, a storage region used as a working area for the CPU 12. The display device 18 displays various data based on control performed by the CPU 12. Examples of the display device 18 include a CRT monitor and a liquid crystal display. The pointing device 20 is an input device by which any position on a display screen of the display device 18 is designated. Examples of the pointing device 20 include a mouse. The character input device 22 is an input device by which any desired character is inputted. Examples of the character input device 22 include a keyboard.

In the projection image correction system 10, an external storage device 26 such as a hard disk is connected to the CPU 12 via the I/O 24 and the bus 14.

In the projection image correction system 10, a read-write device 30 is connected to the CPU 12 via the I/O 24 and the bus 14. The read-write device 30 allows various data produced based on control performed by the CPU 12 to be written and stored in a non-transitory computer readable storage medium 28 such as a CD or DVD (which will hereinafter simply be referred to as a "storage medium" as appropriate), and allows the various data stored in the storage medium 28 to be read into the storage device 16.

In the projection image correction system 10, the projector 106 and the camera 108 provided in the stereolithography apparatus 100 are connected to the CPU 12 via the I/O 24 and the bus 14. Note that conventionally known devices may be used as the projector 106 and the camera 108, and therefore, detailed description thereof will be omitted.

For ease of understanding of the projection image correction system 10, the following description is based on the assumption that a program for carrying out a transformation matrix calculation process by the projection image correction system 10 and various data used for the transformation matrix calculation process are stored in advance in the storage device 16. The transformation matrix calculation process is performed to calculate a projective transformation matrix used for projection image correction.

The program for carrying out the transformation matrix calculation process and the various data used for the transformation matrix calculation process may be read into the RAM of the storage device 16 from outside through communication.

Image data projected from the projector 106 includes a plurality of pieces of image data representing a cross-sectional shape of a three-dimensional shaped object to be produced. These pieces of image data are generated by, for example, a personal computer provided separately. In the present preferred embodiment, the image data generated by the separately provided personal computer is outputted to the projection image correction system 10 and stored in the storage device 16.

Figure 3:
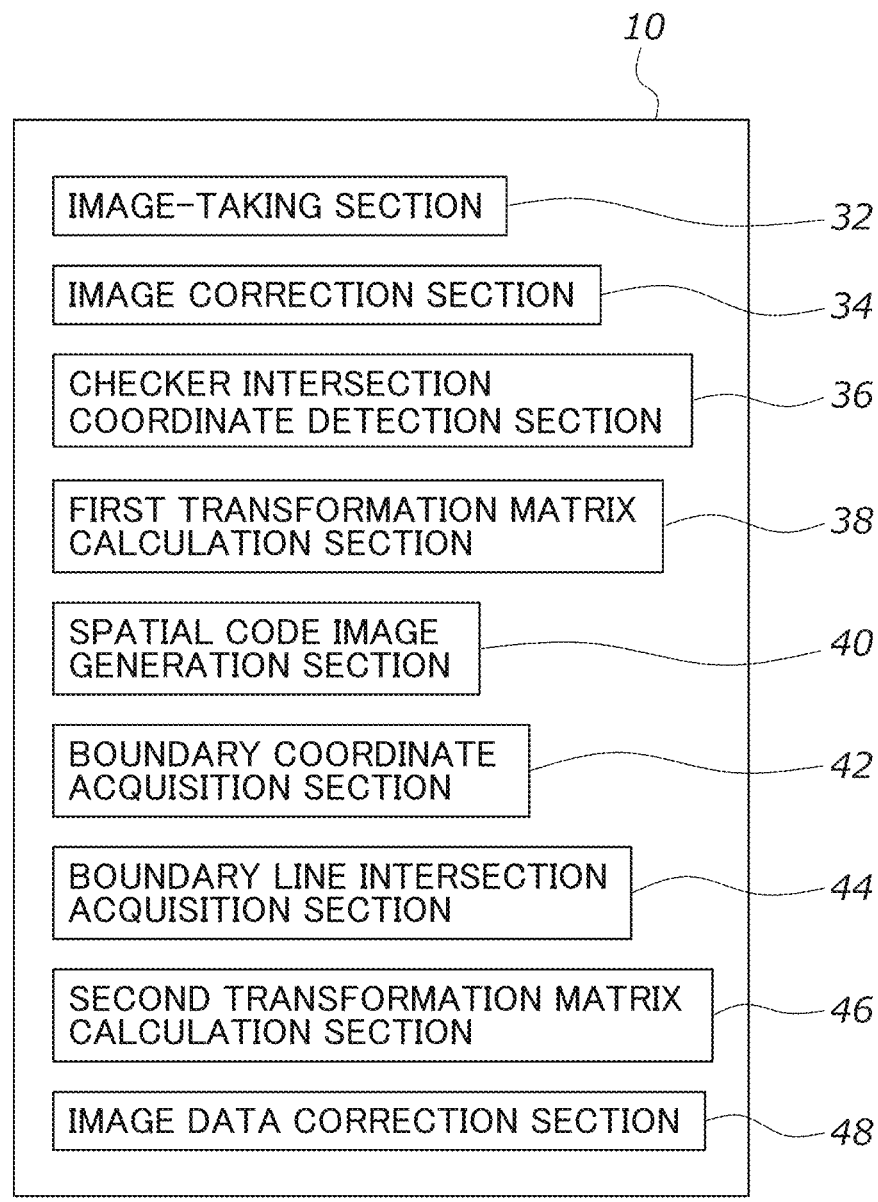
FIG. 3 is a block diagram illustrating main elements of the projection image correction system according to a preferred embodiment of the present invention.

Next, the projection image correction system 10 according to the present preferred embodiment will be described with reference to FIG. 3. FIG. 3 is a block diagram illustrating main elements of the projection image correction system 10 according to the present preferred embodiment.

The projection image correction system 10 according to the present preferred embodiment preferably includes an image-taking section 32, an image correction section 34, a checker intersection coordinate detection section 36, a first transformation matrix calculation section 38, a spatial code image generation section 40, a boundary coordinate acquisition section 42, a boundary line intersection acquisition section 44, a second transformation matrix calculation section 46, and an image data correction section 48.

The image-taking section 32 is capable of taking an image of the entire image projection region of the bottom wall 102a of the container 102. In the present preferred embodiment, the image-taking section 32 is the camera 108.

When an image of a checkered sheet placed on an upper surface 102aa (see FIG. 1) of the bottom wall 102a of the container 102 has been taken by the image-taking section 32, the image correction section 34 corrects the taken checkered sheet image by using internal parameters of the camera 108, i.e., the image-taking section 32. The checkered sheet is placed on the upper surface 102aa of the bottom wall 102a by a worker. The checkered sheet allows projection light to pass therethrough. For example, the checkered sheet is paper on which a checkered pattern is printed.

The checker intersection coordinate detection section 36 detects, with sub-pixel precision, checker intersection coordinates in the corrected checkered sheet image.

The first transformation matrix calculation section 38 calculates a projective transformation matrix $H_1$ for projective transformation of the detected checker intersection coordinates into coordinates in the known image projection region.

The spatial code image generation section 40 generates a spatial code image whose code value changes in a longitudinal direction and a spatial code image whose code value changes in a lateral direction.

The boundary coordinate acquisition section 42 acquires, with sub-pixel precision, boundary coordinates of gray scale values in the spatial code images.

The boundary line intersection acquisition section 44 acquires boundary lines between the gray scale values adjacent to each other in each of the spatial code image whose code value changes in the longitudinal direction and the spatial code image whose code value changes in the lateral direction. Then, the boundary line intersection acquisition section 44 combines the spatial code image whose code value changes in the longitudinal direction and the spatial code image whose code value changes in the lateral direction, thus acquiring coordinates of an intersection at which the boundary lines intersect with each other.

Using the projective transformation matrix $H_1$, the second transformation matrix calculation section 46 transforms the intersection coordinates acquired by the boundary line intersection acquisition section 44. The second transformation matrix calculation section 46 calculates a projective transformation matrix $H_2$ by which projective transformation is performed so that the transformed intersection coordinates are distributed over the entire image projection region.

Using the calculated projective transformation matrix $H_2$, the image data correction section 48 corrects image data of the image projected from the projector 106.

The following description will be made based on the assumption that a projective transformation matrix is acquired by the projection image correction system 10. A projective transformation matrix is used to correct image data to be outputted to the projector 106.

Note that the following description provides an example where a camera, a camera lens, a projector and a checkered sheet which meet the following specifications are used.

The camera is ARTCAM-130MI-BI manufactured by ARTRAY CO., LTD. (1280 by 1024 pixels, B/W).

The camera lens is a Computar megapixel lens with a focal length of 12 mm.

The projector is manufactured to specifications that include 854 by 480 pixels. This projector is used so that an input image size is 1366 by 768 pixels.

The checkered sheet is provided as follows. A size of each checker is 20 mm square. An 8 by 5 checkered pattern is printed in magenta on a ceramic plate by silk-screen printing. A total size is 160 mm by 100 mm. A shaping size in a stereolithography apparatus is 130 mm by 70 mm, and therefore, the total size is adjusted to this size. The checkered sheet is made of, for example, paper which allows projection light to pass therethrough and on which the checkered pattern is printed.

First, a camera calibration is performed in the projection image correction system 10. The camera calibration is performed at a given time, e.g., at the time of shipment from a factory or at the time of adjustment of the projector 106. Camera internal parameters obtained by the camera calibration are stored in the storage device 16. The camera calibration is performed using a separate display device (e.g., a liquid crystal display) which is independent of the projection image correction system 10. Specifically, in performing the camera calibration, an image of the checkered pattern is taken by the camera 108 at the maximum angle of view, and camera parameters are calculated using Zhang's method. In this preferred embodiment, as this checkered pattern, a checkered pattern displayed on the separate display device is used instead of a checkered pattern rendered on the checkered sheet placed on the upper surface 102$aa$ of the bottom wall 102$a$ of the container 102. Note that a technique disclosed in JP 2007-309660 A, for example, is used for a method of calculating camera parameters by Zhang's method, and therefore, detailed description thereof will be omitted.

In performing the camera calibration, a SAMSUNG B2430 (with 1920 by 1080 pixels and a dot pitch of 0.2768 mm), for example, is used as the display device. A 12 by 10 checkered pattern in which a size of each checker is 11.9024 mm square is displayed on this display device, and images of this checkered pattern are taken from five different directions by the camera 108 whose front end is located about 300 mm away from a surface of the display device.

After the camera calibration has been performed, the camera 108 is installed on the stereolithography apparatus 100.

When the projection image correction system 10 is used, only internal parameters of the camera, which include lens distortion coefficients, are utilized by using Equations (1) and (2) calculated by Zhang's method.

[Eq. 1]

$$s\tilde{m} = A[RT]\tilde{M} \tag{1}$$

In Equation (1), "A" represents an internal parameter of the camera 108, "R" represents a rotation matrix of the camera 108, "T" represents a translation vector, and "[RT]" represents an external parameter of the camera 108.

[Eq. 2]

$$\begin{cases} u_d = u + (u - u_0)[k_1(x^2 + y^2) + k_2(x^2 + y^2)^2] \\ v_d = v + (v - v_0)[k_1(x^2 + y^2) + k_2(x^2 + y^2)^2] \end{cases} \tag{2}$$

In Equation (2), "$u_d$" and "$V_d$" represent image coordinates after distortion, "$u_0$" and "$v_0$" represent image center coordinates, and "$k_1$" and "$k_2$" represent distortion coefficients.

With the camera internal parameters stored in the storage device 16, a worker places the checkered sheet on the upper surface 102$aa$ of the bottom wall 102$a$ of the container 102. Then, with the checkered sheet placed inside the container 102, the worker takes an image of the checkered sheet by using the camera 108 (i.e., the image-taking section 32) via the lens. The taken checkered sheet image is stored in the storage device 16.

Figure 4:
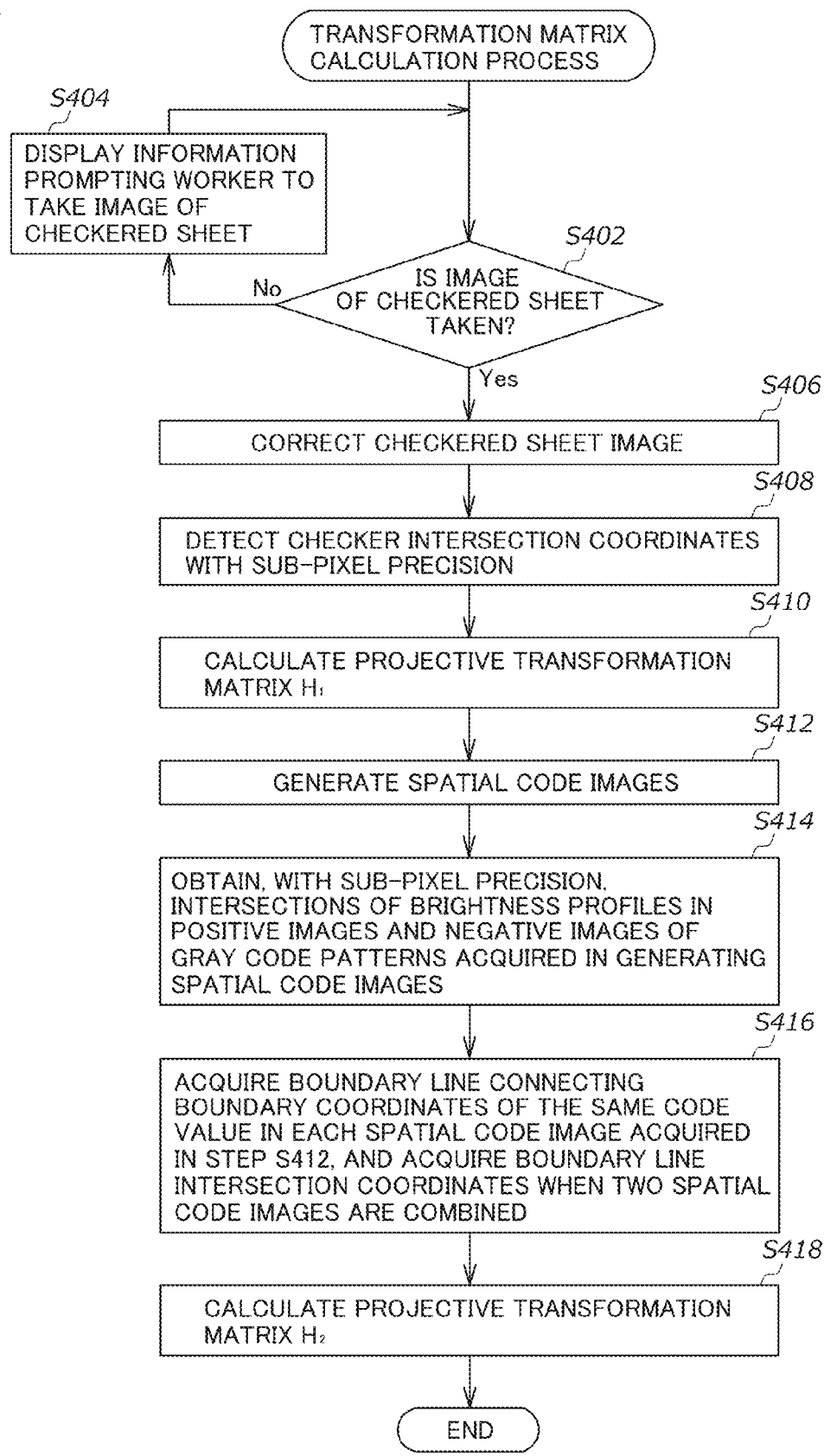
FIG. 4 is a flow chart illustrating a transformation matrix calculation process performed in the projection image correction system according to a preferred embodiment of the present invention.

Next, a procedure for performing a transformation matrix calculation process by the projection image correction system 10 for which the camera calibration has been performed will be described with reference to FIG. 4.

The worker initially provides an instruction for start of transformation matrix calculation by using the pointing device 20 and/or the character input device 22. Thus, the transformation matrix calculation process starts in the projection image correction system 10.

First, upon start of the transformation matrix calculation process, whether or not an image of the checkered sheet has been taken is determined in Step S402. Specifically, the control section 114 determines whether or not a checkered sheet image is stored in the storage device 16.

Upon determination in Step S402 that an image of the checkered sheet has not been taken, i.e., upon determination in Step S402 that no checkered sheet image is stored in the storage device 16, the process proceeds to Step S404. In contrast, upon determination in Step S402 that an image of the checkered sheet has been taken, i.e., upon determination in Step S402 that a checkered sheet image is stored in the storage device 16, the process proceeds to Step S406.

In Step S404, information that prompts the worker to take an image of the checkered sheet is displayed on the display device 18. Then, the process returns to Step S402.

In Step S406, using the internal parameters of the camera 108, the image correction section 34 corrects lens-induced distortion of the checkered sheet image stored in the storage device 16.

Subsequently, in Step S408, the checker intersection coordinate detection section 36 detects, with sub-pixel precision, checker intersection coordinates in the checkered sheet image corrected in Step S406.

Figure 5:
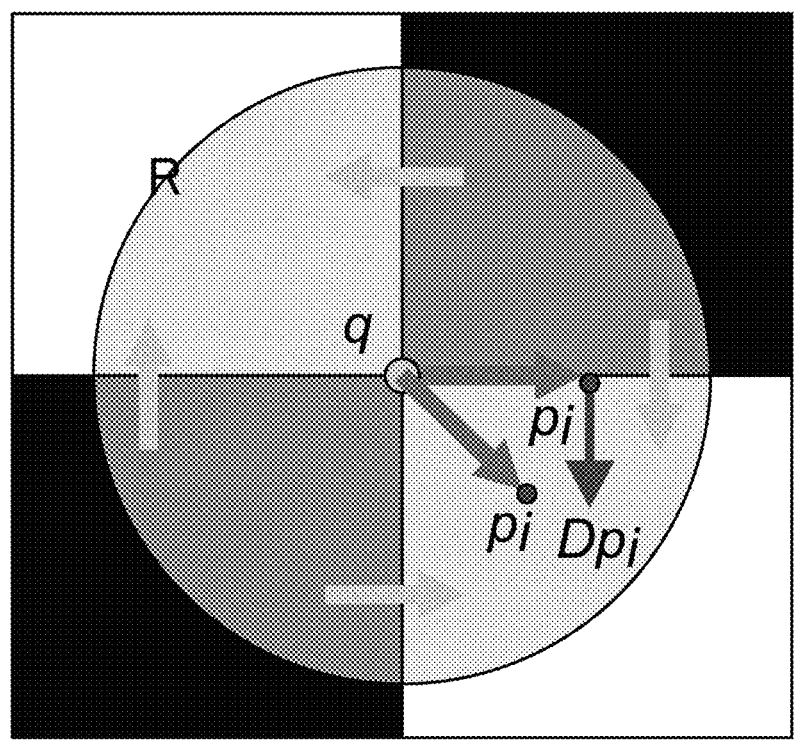
FIG. 5 is an explanatory diagram illustrating a sub-pixel estimation method for checker intersection coordinates.

In Step S408, sub-pixels of the checker intersection coordinates are estimated. As illustrated in FIG. 5, at a boundary between checkers in the checkered pattern, a vector pi-q and a brightness gradient vector $Dp_i$ are perpendicular to each other, and an inner product value $\epsilon_i$ thereof is 0. "q" represents center coordinates with desired sub-pixel precision. "$p_i$" represents coordinates of each point within a circular field of view R. "$Dp_i$" represents a brightness gradient vector for $p_i$.

When q is a true intersection, a sum total of the inner product values $\epsilon_i$ is closest to 0. In contrast, when q is a point other than a true intersection, each inner product value $\epsilon_i$ is greater than 0, so that a sum total of the inner product values $\epsilon_i$ is also greater than 0. Therefore, using a nonlinear least squares method (Levenberg-Marquardt method), the sub-pixel coordinates q at which a sum of squares of all the inner product values $\epsilon_i$ is minimized are calculated by the following equation.

$$\sum_i \varepsilon_i^2 = \sum_i (Dp_i^T \cdot (p_i - q))^2 \quad [\text{Eq. 3}]$$

In Step S410, the first transformation matrix calculation section 38 calculates the projective transformation matrix $H_1$ for transformation of the detected checker intersection coordinates into coordinates in the known image projection region. In this preferred embodiment, checker intersection coordinates obtained when an image of the checkered sheet located in an image projection region is taken from an appropriate position are stored in advance in the storage device 16. The checker intersection coordinates adjacent to each other in the image projection region are located at equal intervals. The term "appropriate position" refers to, for example, a position at which the checkered sheet is located at the maximum angle of view of the camera 108, and a line of sight of the camera 108 and the checkered sheet are perpendicular to each other.

Figure 6:
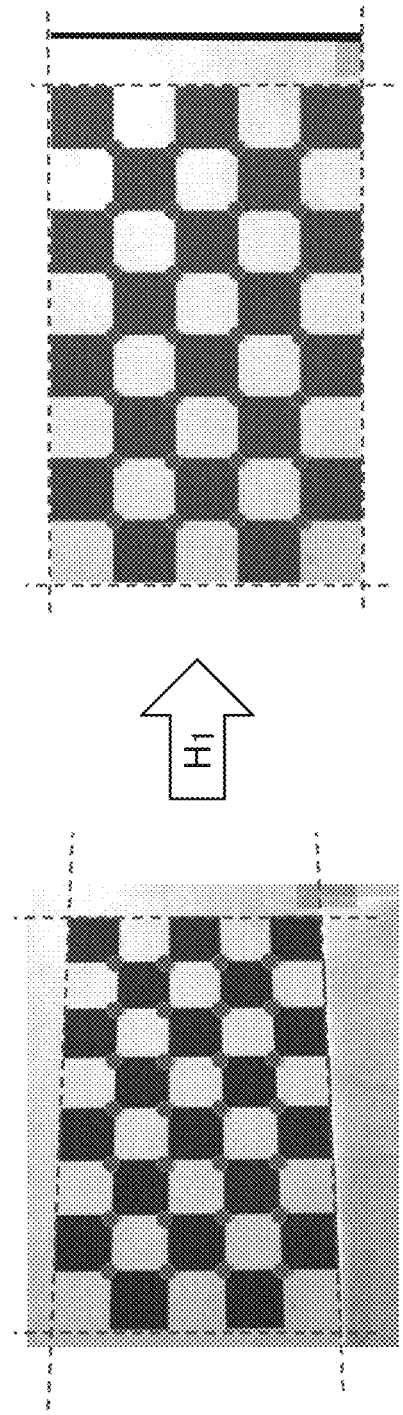
FIG. 6 is an explanatory representation illustrating transformation of checker intersection coordinates of a checkered sheet from a camera image coordinate system into a shaping region coordinate system.

In Step S410, the projective transformation matrix $H_1$ is calculated. As illustrated in FIG. 6, the projective transformation matrix $H_1$ is used for projective transformation of the checker intersection coordinates (camera image coordinate system) detected in Step S408 into the checker intersection coordinates (coordinate system of a shaping region, i.e., the image projection region) stored in the storage device 16.

A method of calculating the projective transformation matrix $H_1$ will be described below.

As the projective transformation matrix $H_1$, a projective transformation matrix H by which source image coordinates (xs, ys) equivalent to the checker intersection coordinates detected in Step S408 are transformed into target image coordinates (xt, yt) equivalent to the checker intersection coordinates stored in the storage device 16 is obtained.

[Eq. 4]

$$s \begin{bmatrix} x_t \\ y_t \\ 1 \end{bmatrix} = H \begin{bmatrix} x_s \\ y_s \\ 1 \end{bmatrix}, H = \begin{bmatrix} h_{11} & h_{12} & h_{13} \\ h_{21} & h_{22} & h_{23} \\ h_{31} & h_{32} & h_{33} \end{bmatrix} \quad (4)$$

n sets of image coordinate values obtained before and after the transformation are applied to Equation (4).

$$\begin{cases} sx_m = h_{11}x_{sn} + h_{12}y_{sn} + h_{13} \\ sy_m = h_{21}x_{sn} + h_{22}y_{sn} + h_{23} \\ s = h_{31}x_{sn} + h_{32}y_{sn} + h_{33} \end{cases} \quad [\text{Eq. 5}]$$

$$\begin{cases} h_{11}x_{sn} + h_{12}y_{sn} + h_{13} - h_{31}x_{sn}x_m - h_{32}y_{sn}x_m - h_{33}x_m = 0 \\ h_{21}x_{sn} + h_{22}y_{sn} + h_{23} - h_{31}x_{sn}y_m - h_{32}y_{sn}y_m - h_{33}y_m = 0 \end{cases} \quad [\text{Eq. 6}]$$

$$\begin{bmatrix} x_{s1} & y_{s1} & 1 & 0 & 0 & 0 & -x_{s1}x_{t1} & -y_{s1}x_{t1} & -x_{t1} \\ 0 & 0 & 0 & x_{s1} & y_{s1} & 1 & -x_{s1}y_{t1} & -y_{s1}y_{t1} & -y_{t1} \\ & & & & \vdots & & & & \\ x_{sn} & y_{sn} & 1 & 0 & 0 & 0 & -x_{sn}x_{tm} & -y_{sn}x_{tm} & -x_{tm} \\ 0 & 0 & 0 & x_{sn} & y_{sn} & 1 & -x_{sn}y_{tm} & -y_{sn}y_{tm} & -y_{tm} \end{bmatrix} \begin{bmatrix} h_{11} \\ h_{12} \\ \vdots \\ h_{32} \\ h_{33} \end{bmatrix} = \begin{bmatrix} 0 \\ 0 \\ \vdots \\ 0 \\ 0 \end{bmatrix} \quad [\text{Eq. 7}]$$

When this equation (Eq. 7) is expressed as B·h=0, h is obtained as a right singular vector corresponding to the minimal singular value of B or a characteristic vector corresponding to the minimal characteristic value of $B^T B$ (for example, a function such as SVD::solvez( ) is utilized for OpenCV 2.x). Note that a conventionally known technique (see, for example, Gang Xu, 3D CG from Photographs, Kindai Kagaku Sha), for example, is used for such a technique, and therefore, detailed description thereof will be omitted.

When the projective transformation matrix $H_1$ has been calculated in Step S410, the process then proceeds to Step S412 in which an 8-bit Gray code pattern is projected on the bottom wall 102a of the container 102 from the projector 106. The camera 108 takes an image of the projected Gray code pattern. The spatial code image generation section 40 generates a spatial code image from each taken image.

Specifically, the control section 114 sequentially outputs, to the projector 106, data of positive images of a vertical Gray code pattern and data of negative images of a vertical Gray code pattern which are stored in advance in the storage device 16. Then, as illustrated in FIG. 7A, the 8-bit vertical Gray code patterns are projected as the positive images and negative images on the bottom wall 102a of the container 102 from the projector 106.

An image of each of the projected Gray code patterns is taken by the camera 108. Each of the taken images is outputted to the spatial code image generation section 40.

Using the internal parameters of the camera 108, the spatial code image generation section 40 corrects lens distortion of each of the taken images. As illustrated in FIG. 7B, the spatial code image generation section 40 generates binary images from differences between brightness values of the corrected 8-bit positive images and brightness values of the corrected 8-bit negative images. Then, as illustrated in FIG. 7C, the spatial code image generation section 40 generates, from the 8-bit binary images, a spatial code image whose code value changes in a lateral direction (i.e., a gray scale image whose brightness value changes in the lateral direction in the range of 0 to 255).

Furthermore, the control section 114 sequentially outputs, to the projector 106, data of positive images of a horizontal Gray code pattern and data of negative images of a horizontal Gray code pattern which are stored in advance in the storage device 16. Then, as illustrated in FIG. 8A, the 8-bit horizontal Gray code patterns are projected as the positive images and negative images on the bottom wall 102a of the container 102 from the projector 106.

An image of each of the projected Gray code patterns is taken by the camera 108. Each of the taken images is outputted to the spatial code image generation section 40.

Using the internal parameters of the camera 108, the spatial code image generation section 40 corrects lens distortion of each of the taken images. As illustrated in FIG. 8B, the spatial code image generation section 40 generates binary images from differences between brightness values of the corrected 8-bit positive images and brightness values of the corrected 8-bit negative images. Then, as illustrated in FIG. 8C, the spatial code image generation section 40 generates, from the 8-bit binary images, a spatial code image whose code value changes in a longitudinal direction (i.e., a gray scale image whose brightness value changes in the longitudinal direction in the range of 0 to 255).

Figure 9A:
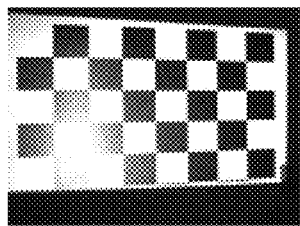
FIG. 9A is an explanatory representation illustrating a "totally projected image".
Figure 9B:
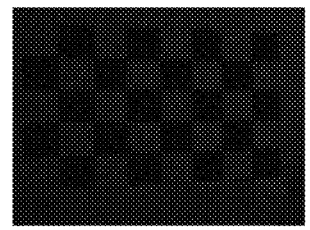
FIG. 9B is an explanatory representation illustrating a "totally blacked out image".
Figure 9C:
FIG. 9C is an explanatory representation illustrating a mask image generated from the totally projected image illustrated in FIG. 9A and the totally blacked out image illustrated in FIG. 9B.

Note that in Step S412, in order to mask pixels of a portion of the image projection region where no image is projected from the projector 106, the spatial code image generation section 40 generates a "totally projected image" and a "totally blacked out image". As used herein, the term "totally projected image" refers to an image obtained when the entire image projection region is irradiated with light outputted from the projector 106 (see FIG. 9A), and the term "totally blacked out image" refers to an image obtained when the entire image projection region is not irradiated at all with light from the projector 106 (see FIG. 9B). Then, the spatial code image generation section 40 makes a comparison between brightness of the totally projected image and brightness of the totally blacked out image in each given pixel so as to generate a mask image (see FIG. 9C) in which lower brightness in each pixel is 0.

In Step S414, the boundary coordinate acquisition section acquires, with sub-pixel precision, an intersection of a brightness profile of the corrected positive images of the Gray code pattern and a brightness profile of the corrected negative images of the Gray code pattern which are acquired in Step S412.

Figure 10:
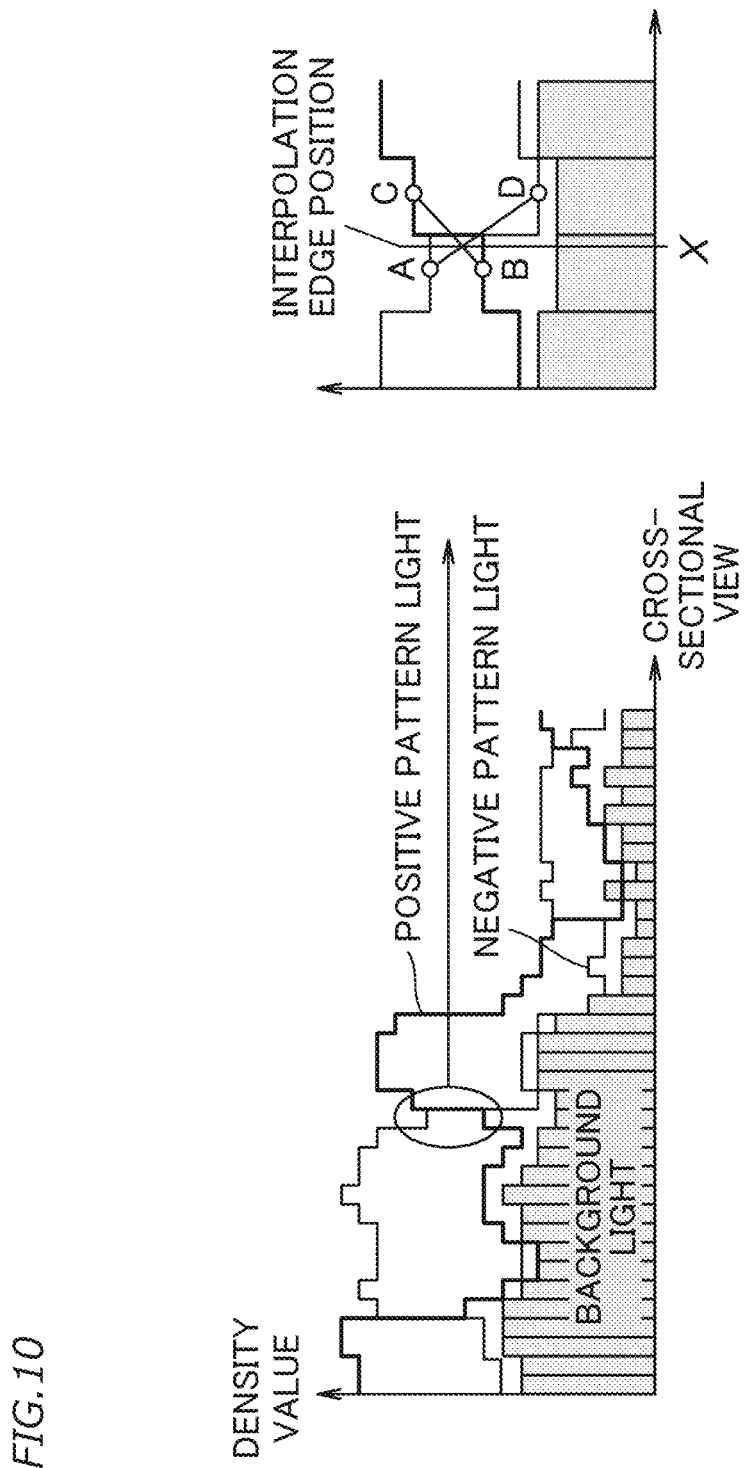
FIG. 10 is an explanatory diagram illustrating a method for obtaining an intersection of brightness profiles which serves as boundary coordinates with sub-pixel precision.
Figure 12:
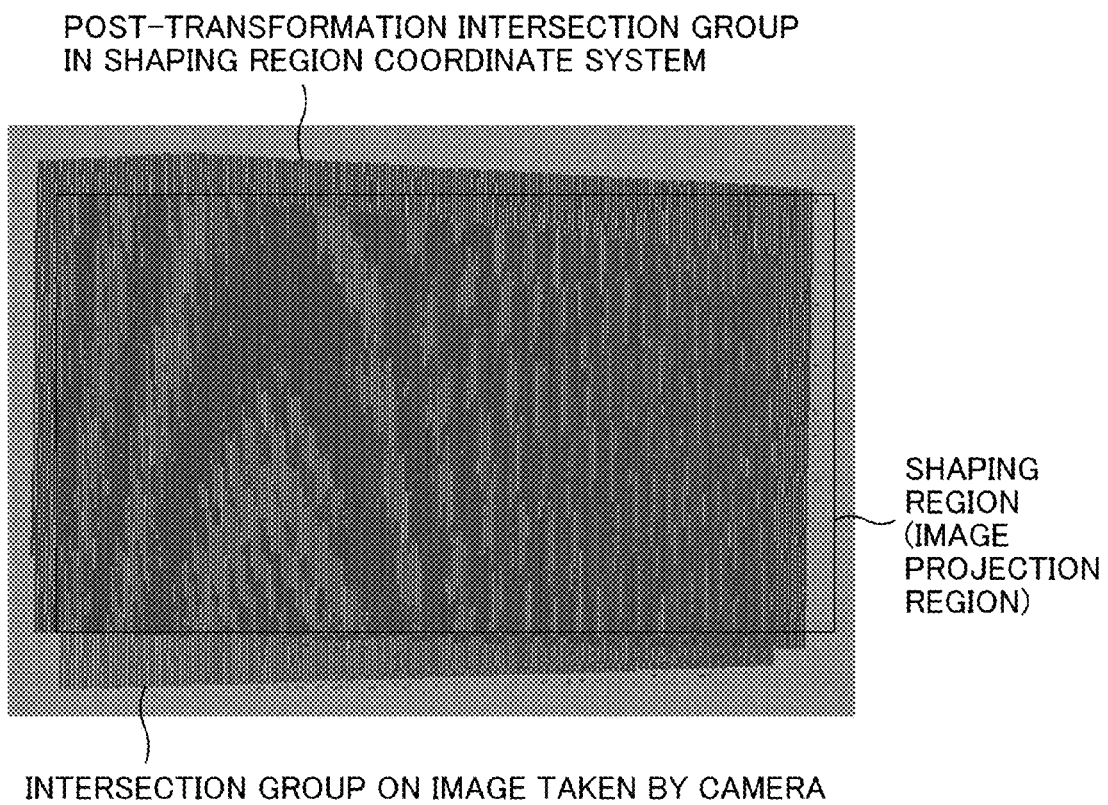
FIG. 12 is an explanatory representation illustrating an intersection group on an image taken by a camera, an intersection group obtained after transformation from a camera image coordinate system into a shaping region coordinate system, and a shaping region.
Figure 13A:
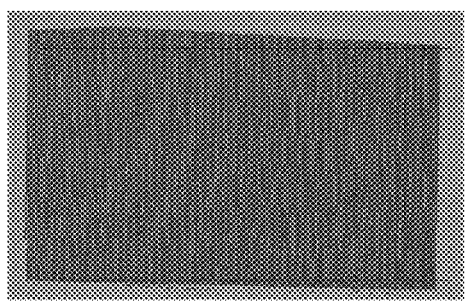
FIG. 13A is an explanatory representation illustrating an intersection group obtained after transformation by a projective transformation matrix $H_1$.
Figure 13B:
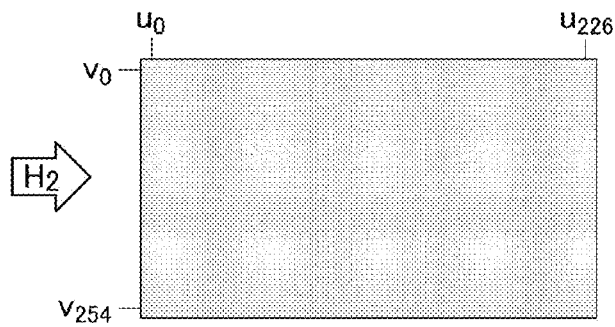
FIG. 13B is an explanatory representation illustrating an intersection group ideally arranged in the shaping region.
Figure 13C:
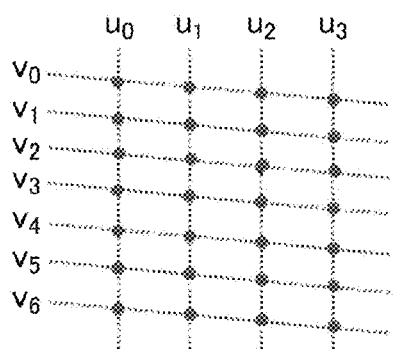
FIG. 13C is an explanatory diagram illustrating, in an enlarged manner, an upper left end of the intersection group that is obtained after transformation by the projective transformation matrix $H_1$ and illustrated in FIG. 13A.
Figure 13D:
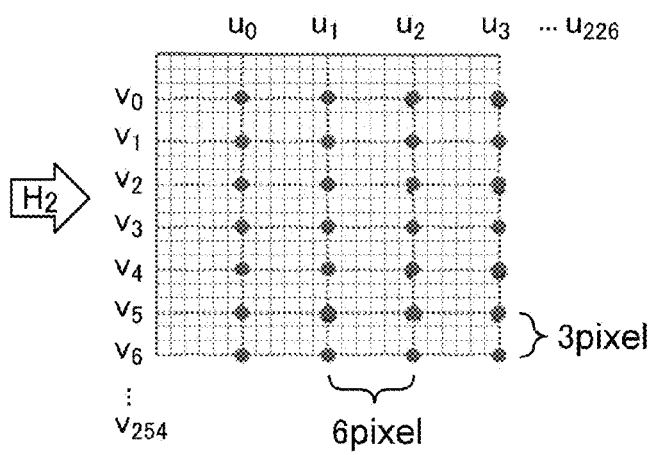
FIG. 13D is an explanatory diagram illustrating, in an enlarged manner, an upper left end of the intersection group that is ideally arranged in the shaping region and illustrated in FIG. 13B.

Specifically, as illustrated in FIG. 10, the boundary coordinate acquisition section 42 obtains, with sub-pixel precision, an intersection of the brightness profiles in the corrected 8-bit positive images and negative images of the vertical Gray code pattern. This intersection serves as boundary coordinates obtained with sub-pixel precision for the code value of the spatial code image whose code value changes in the lateral direction.

Furthermore, as illustrated in FIG. 10, the boundary coordinate acquisition section 42 obtains, with sub-pixel precision, an intersection of the brightness profiles in the corrected 8-bit positive images and negative images of the horizontal Gray code pattern. This intersection serves as boundary coordinates obtained with sub-pixel precision for the code value of the spatial code image whose code value changes in the longitudinal direction.

Note that a conventionally known technique (see, for example, Kosuke Sato and Seiji Inokuchi, 3D Imaging Techniques for Measurement, Syokoudo) is used for a method of calculating, with sub-pixel precision, boundary coordinates for a code value of a spatial code image, and therefore, detailed description thereof will be omitted.

In Step S416, the boundary line intersection acquisition section 44 acquires boundary lines connecting the boundary coordinates of the same code value in each of the spatial code images acquired in Step S412, i.e., the spatial code image whose code value changes in the lateral direction and the spatial code image whose code value changes in the longitudinal direction. Then, the boundary line intersection acquisition section 44 combines the spatial code image whose code value changes in the lateral direction and the spatial code image whose code value changes in the longitudinal direction, and thus acquires first intersection coordinates of: the boundary line in the spatial code image whose code value changes in the lateral direction; and the boundary line in the spatial code image whose code value changes in the longitudinal direction.

Specifically, the boundary line intersection acquisition section 44 acquires the boundary lines connecting the boundary coordinates of the same code value based on the boundary coordinates obtained with sub-pixel precision for the code values in the spatial code images calculated in Step S414. Assuming that a boundary line between a "code value n" and a "code value n+1" adjacent to the "code value n" is defined as a "boundary n", n (=0 to 254 [maximum value]) boundary lines are obtained in the spatial code image whose code value changes in the lateral direction. These boundary lines are arranged in the longitudinal direction. Furthermore, n (=0 to 254 [maximum value]) boundary lines are obtained in the spatial code image whose code value changes in the longitudinal direction. These boundary lines are arranged in the lateral direction.

Note that when the above-mentioned projector manufactured to specifications which include 854 by 480 pixels is used, n (=0 to 226) boundary lines are obtained in the spatial code image whose code value changes in the lateral direction, and n (=0 to 254) boundary lines are obtained in the spatial code image whose code value changes in the longitudinal direction.

As illustrated in FIG. 11, upon acquisition of the boundary lines in the spatial code images, the boundary line intersection acquisition section 44 combines the spatial code image whose code value changes in the lateral direction and the spatial code image whose code value changes in the longitudinal direction, and thus acquires the first intersection coordinates of the boundary lines arranged in the lateral direction and the boundary lines arranged in the longitudinal direction in the combined image. Note that in FIG. 11, the boundary lines arranged in the lateral direction are represented as Un (n=0 to 226), and the boundary lines arranged in the longitudinal direction are represented as Vn (n=0 to 254).

In Step S418, the second transformation matrix calculation section 46 calculates the projective transformation matrix $H_2$ for projective transformation of the first intersection coordinates of the boundary lines acquired in Step S416 into second intersection coordinates distributed over the entire image projection region.

Specifically, using the projective transformation matrix $H_1$ calculated in Step S410, the second transformation matrix calculation section 46 transforms the acquired first intersection coordinates of the boundary lines into coordinates of the coordinate system of the shaping region which is the image projection region.

As illustrated in FIGS. 13A to 13D, using the above-described method, the second transformation matrix calculation section 46 subsequently calculates the projective transformation matrix $H_2$ for projective transformation of a group of intersections, which have been transformed into the coordinates of the coordinate system of the shaping region (i.e., the image projection region), into the second intersection coordinates distributed over the entire shaping region.

In other words, the second transformation matrix calculation section 46 calculates the projective transformation matrix $H_2$ for transformation of the first intersection coordinates of the boundary lines acquired in Step S416 into the second intersection coordinates of the boundary lines in a normal image in which boundary lines are placed in a grid pattern on a projector image.

When the number of pixels of the projector is "X" by "Y" pixels, the second intersection coordinates of the boundary lines in the normal image are calculated as follows. First, the second transformation matrix calculation section 46 calculates, for "Y" (i.e., the number of pixels for a short line of the projector image), intervals (i.e., the number of pixels) at which the longitudinally arranged boundary lines (i.e., Vn) acquired in Step S416 are uniformly distributed.

The value of "j" obtained when the value of $\{Y+(j-1)\}/j$ is closest to the number of the longitudinally arranged boundary lines acquired in Step S416 is defined as an interval (i.e., the number of pixels) between the boundary lines adjacent to each other. Note that "j" is a positive integer.

For example, when the projector manufactured to specifications that include 854 by 480 pixels is used (with an input image size of 1366 by 769 pixels), the number of pixels for "Y" is "768", and the number of the longitudinally arranged boundary lines acquired in Step S416 is "255" (because the number of the boundary lines Vn is n=0 to 254). Therefore, "j" by which the value of $\{768+(j-1)\}/j$ is closest to "255" is obtained.

In this case, "j" is "3", and therefore, the longitudinally arranged boundary lines Vn are provided in the normal image so that an interval of 3 pixels is provided between the boundary lines adjacent to each other.

Subsequently, the second transformation matrix calculation section 46 calculates, for "X" (i.e., the number of pixels for a long line of the projector image), intervals (i.e., the number of pixels) at which the laterally arranged boundary lines (i.e., Un) acquired in Step S416 are uniformly distributed.

The value of "k" obtained when the value of $\{X+(k-1)\}/k$ is closest to the number of the laterally arranged boundary lines acquired in Step S416 is defined as an interval (i.e., the number of pixels) between the boundary lines adjacent to each other. Note that "k" is a positive integer.

For example, when the projector manufactured to specifications that include 854 by 480 pixels is used (with an input image size of 1366 by 769 pixels), the number of pixels for "X" is "1366", and the number of the laterally arranged boundary lines acquired in Step S416 is "227" (because the number of the boundary lines Un is n=0 to 226). Therefore, "k" by which the value of $\{1366+(k-1)\}/k$ is closest to "227" is obtained.

In this case, "k" is "6", and therefore, the laterally arranged boundary lines Un are provided in the normal image so that an interval of 6 pixels is provided between the boundary lines adjacent to each other.

Thus, the normal image in which the longitudinally arranged boundary lines Vn and the laterally arranged boundary lines Un are provided in a grid pattern is obtained. The second transformation matrix calculation section 46 calculates the second intersection coordinates of the boundary lines Vn and the boundary lines Un in this normal image.

Alternatively, the second intersection coordinates of the boundary lines in such a normal image may be calculated in advance, or may be acquired when the projective transformation matrix $H_2$ is calculated in Step S418.

The second transformation matrix calculation section 46 calculates the projective transformation matrix $H_2$ by which the first intersection coordinates of the longitudinally arranged boundary lines Vn and the laterally arranged boundary lines Un, obtained when the spatial code images are combined in Step S416, are transformed into the second intersection coordinates of the boundary lines in the normal image.

A method of calculating the projective transformation matrix $H_2$ in this case is similar to the method of calculating the projective transformation matrix $H_1$. When the projective transformation matrix $H_2$ is calculated, the source image coordinates (xs, ys) are defined as the coordinates of the intersections of the longitudinally arranged boundary lines Vn and the laterally arranged boundary lines Un obtained when the spatial code images are combined in Step S416, and the target image coordinates (xt, yt) are defined as the intersection coordinates of the boundary lines in the normal image.

When the projective transformation matrix $H_2$ is calculated, not all of the intersection coordinates of the boundary lines, obtained by projective transformation by the projective transformation matrix $H_1$, are intended for the calculation of the projective transformation matrix $H_2$, but some of the intersection coordinates obtained by leaving out the intersection coordinates at regular intervals are intended for the calculation of the projective transformation matrix $H_2$. For example, the intersection coordinates obtained at intervals of 8 boundary lines are intended for the calculation of the projective transformation matrix $H_2$.

The calculated projective transformation matrix $H_2$ is outputted to the storage device 16 from the second transformation matrix calculation section 46, and stored in the storage device 16.

When a three-dimensional shaped object is actually shaped in the stereolithography apparatus 100, upon input of image data of an image, projected from the projector 106 in advance, to the control section 114, the image data correction section 48 performs projective transformation of the inputted image data by using the projective transformation matrix $H_2$.

Specifically, pre-transformation coordinate values (real number) are obtained from post-transformation integer coordinates, and pixel values at these coordinates are obtained by bilinear interpolation, thus performing the projective transformation of the image data by using the projective transformation matrix $H_2$. Note that in this image data projective transformation process performed using the projective transformation matrix $H_2$, a function such as warpPerspective( ) may be used for OpenCV 2.x, for example.

The image data on which projective transformation has been performed by the image data correction section 48 is outputted to the storage device 16 and stored in the storage device 16. When an instruction for production of a three-dimensional shaped object is provided in the stereolithography apparatus 100, the image data stored in the storage device 16 is outputted to the projector 106.

As described above, the projection image correction system according to the present preferred embodiment calculates a projective transformation matrix for correction of an image projected from the projector 106, and corrects, using the calculated projective transformation matrix, the image projected from the projector 106.

The projection image correction system 10 and projection image correction method according to the present preferred embodiment allow an image to be projected in a proper state on the image projection region without adjusting the installation position and/or orientation of the projector 106.

Installation of the projection image correction system 10 according to the present preferred embodiment in the stereolithography apparatus 100, for example, makes it unnecessary to provide a mechanism for adjusting the installation position and/or orientation of the projector unlike a conventional stereolithography apparatus, and therefore, an increase in size of the entire apparatus is prevented. Moreover, the number of components is reduced, thus cutting down manufacturing cost.

Note that the foregoing preferred embodiment may be varied as in Variations 1 to 3.

Variation 1

Although the foregoing preferred embodiment has been described based on the assumption that the projection image correction system 10 is installed on the stereolithography apparatus 100, the projection image correction system 10 may be used for an apparatus other than the stereolithography apparatus 100, which is equipped with a projector that projects various images.

Variation 2

Although no specific mention is made in the foregoing preferred embodiment, the camera 108 may be detachably provided in the projection image correction system 10. More specifically, the camera 108 may be attached to a given position of the stereolithography apparatus 100 only when the projective transformation matrix $H_2$ is calculated at a given time, e.g., at the time of shipment of the stereolithography apparatus 100 or at the time of adjustment of the projector 106.

Variation 3

The foregoing preferred embodiment and Variation(s) 1 and/or 2 described above may be combined with each other as appropriate.

Preferred embodiments of the present invention may be applied to an apparatus such as a stereolithography apparatus which includes a mechanism configured to project an image from a projector.

The terms and expressions used herein are for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art based on the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A projection image correction system for correcting image data to be outputted to a projector, the system comprising:
    an image-taking section configured to take, via a lens, an image of a checkered sheet placed in a region where an image is projected from the projector;
    a correction section configured to correct lens-induced distortion of the taken checkered sheet image by using an internal parameter of the image-taking section;
    a checker intersection coordinate detection section configured to detect, with sub-pixel precision, checker intersection coordinates in the corrected checkered sheet image;
    a first transformation matrix calculation section configured to calculate a first projective transformation matrix for projective transformation of the detected checker intersection coordinates into checker intersection coordinates located at equal intervals in the region;
    a generation section configured to correct, when first positive images and first negative images of an 8-bit vertical Gray code pattern projected on the region from the projector are taken by the image-taking section, lens-induced distortion of the taken first positive images and first negative images by using the internal parameter of the image-taking section, and generate a first spatial code image whose code value changes in a lateral direction based on the corrected first positive images and first negative images, and to correct, when second positive images and second negative images of an 8-bit horizontal Gray code pattern projected on the region from the projector are taken by the image-taking section, lens-induced distortion of the taken second positive images and second negative images by using the internal parameter of the image-taking section, and generate a second spatial code image whose code value changes in a longitudinal direction based on the corrected second positive images and second negative images;
    a boundary coordinate acquisition section configured to obtain, with sub-pixel precision, an intersection of brightness profiles in the corrected first positive images and first negative images, and obtain, with sub-pixel precision, an intersection of brightness profiles in the corrected second positive images and second negative images, thus acquiring the obtained intersections as boundary coordinates;
    a boundary line intersection acquisition section configured to acquire, based on the acquired boundary coordinates, a boundary line connecting the boundary coordinates of the same code value in each of the first and second spatial code images, and combine the first and second spatial code images, thus acquiring coordinates of an intersection of the boundary line in the first spatial code image and the boundary line in the second spatial code image;
    a second transformation matrix calculation section configured to transform the acquired intersection coordinates by using the first projective transformation matrix, and calculate a second projective transformation matrix by which projective transformation is performed so that the transformed intersection coordinates are distributed over the entire region; and
    an image data correction section configured to transform, using the second projective transformation matrix, image data to be outputted to the projector, thus correcting the image data.

2. A non-transitory computer readable storage medium in which a program that allows a computer to function as the projection image correction system according to claim 1 is stored.

3. A projection image correction method for correcting image data to be outputted to a projector, the method comprising:
    preparing an image-taking section that includes a lens;
    taking, via the lens, an image of a checkered sheet placed in a region where an image is projected from the projector;
    correcting lens-induced distortion of the taken checkered sheet image by using an internal parameter of the image-taking section;
    detecting, with sub-pixel precision, checker intersection coordinates in the corrected checkered sheet image;

calculating a first projective transformation matrix for projective transformation of the detected checker intersection coordinates into checker intersection coordinates located at equal intervals in the region;

taking first positive images and first negative images of an 8-bit vertical Gray code pattern projected on the region from the projector by the image-taking section, correcting lens-induced distortion of the taken first positive images and first negative images by using the internal parameter of the image-taking section, and generating a first spatial code image whose code value changes in a lateral direction based on the corrected first positive images and first negative images;

taking second positive images and second negative images of an 8-bit horizontal Gray code pattern projected on the region from the projector by the image-taking section, correcting lens-induced distortion of the taken second positive images and second negative images by using the internal parameter of the image-taking section, and generating a second spatial code image whose code value changes in a longitudinal direction based on the corrected second positive images and second negative images;

obtaining, with sub-pixel precision, an intersection of brightness profiles in the corrected first positive images and first negative images, and obtaining, with sub-pixel precision, an intersection of brightness profiles in the corrected second positive images and second negative images, thus acquiring the obtained intersections as boundary coordinates;

acquiring, based on the acquired boundary coordinates, a boundary line connecting the boundary coordinates of the same code value in each of the first and second spatial code images, and combining the first and second spatial code images, thus acquiring coordinates of an intersection of the boundary line in the first spatial code image and the boundary line in the second spatial code image;

transforming the acquired intersection coordinates by using the first projective transformation matrix, and calculating a second projective transformation matrix by which projective transformation is performed so that the transformed intersection coordinates are distributed over the entire region; and transforming, using the second projective transformation matrix, image data to be outputted to the projector, thus correcting the image data.

4. A non-transitory computer readable storage medium in which a program that allows a computer to carry out the projection image correction method according to claim 3 is stored.

* * * * *